(12) United States Patent
Brady

(10) Patent No.: US 7,743,280 B2
(45) Date of Patent: Jun. 22, 2010

(54) METHOD AND SYSTEM FOR ANALYZING MEMORY LEAKS OCCURRING IN JAVA VIRTUAL MACHINE DATA STORAGE HEAPS

(75) Inventor: Michael John Brady, Gosford (AU)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 11/679,725

(22) Filed: Feb. 27, 2007

(65) Prior Publication Data

US 2008/0209404 A1 Aug. 28, 2008

(51) Int. Cl.
*G06F 11/00* (2006.01)
(52) U.S. Cl. .......................................... 714/38; 711/159
(58) Field of Classification Search ........................ None
See application file for complete search history.

(56) References Cited

U.S. PATENT DOCUMENTS

| | | | | |
|---|---|---|---|---|
| 6,167,535 A * | 12/2000 | Foote et al. | .................... | 714/38 |
| 7,313,661 B1 * | 12/2007 | Dmitriev | ..................... | 711/159 |
| 7,325,106 B1 * | 1/2008 | Dmitriev et al. | ............. | 711/159 |
| 7,444,484 B2 * | 10/2008 | Achanta et al. | ............. | 711/159 |
| 2004/0107385 A1 * | 6/2004 | Bates et al. | .................... | 714/25 |
| 2005/0081190 A1 * | 4/2005 | Betancourt et al. | ........... | 717/124 |
| 2005/0091645 A1 * | 4/2005 | Chilimbi et al. | ............. | 717/130 |
| 2005/0289307 A1 * | 12/2005 | Achanta et al. | ............. | 711/159 |
| 2006/0253845 A1 * | 11/2006 | Achanta et al. | ............. | 717/151 |
| 2006/0265438 A1 * | 11/2006 | Shankar et al. | ............. | 707/206 |
| 2006/0277440 A1 * | 12/2006 | Minshall et al. | ................ | 714/38 |

\* cited by examiner

*Primary Examiner*—Michael C Maskulinski
(74) *Attorney, Agent, or Firm*—Lee Law, PLLC; Christopher B. Lee

(57) ABSTRACT

An invention is disclosed for analyzing memory leaks occurring in Java Virtual Machine (JVM) data storage, consisting of a dynamically modifiable JVM "profiler" and an "object tracker" tool for analyzing the output from the profiler. Specifically, a method and system is disclosed for programming a JVM profiler used to analyze and correct memory leaks in stored data heaps, consisting of a program segment (or "stub") initialized by the JVM application program interface to determine the parameters to be passed to the main profiler memory leak analysis program logic, which is then initialized by the stub to examine a minimal number of "heap dumps" in order to identify data elements or objects for the existence and/or correction of memory leaks. Updated information on data elements or objects can be requested from the profiler as needed by use of the object movement tracking option to record the details of subsequent changes in data memory storage status once a heap dump has been obtained.

15 Claims, 2 Drawing Sheets

METHOD AND SYSTEM FOR ANALYZING MEMORY LEAKS OCCURRING IN JAVA VIRTUAL MACHINE DATA STORAGE HEAPS

TECHNICAL FIELD

This invention relates to analyzing memory leaks occurring in Java Virtual Machine (JVM) data storage.

BACKGROUND

This invention discloses a programming method and system that solves the problems existing in prior art techniques for analyzing and correcting memory leaks in large Java Virtual Machine (JVM) "heaps" in which data elements or objects are stored in a managed heap. The introduction of Java Virtual Machines (JVMs) incorporating memory space for storing computer program instructions and data to be processed by 64-bit central processing units (CPUs) makes it possible to significantly increase the number of addressable memory locations (or "memory space") and to increase the amount of data (or "heap size") capable of being processed using the JVM. For example, with a 64-bit CPU, it is possible to specify JVM heap sizes of over 4 Gigabytes (GB). Diagnosing an unanticipated accumulation of data objects in memory (or "memory leak") occurring as a result of JVM operations when it is utilizing a large heap size is not always possible with existing memory analysis tools (such as "hprof"), since such tools typically rely on obtaining a representation of data heap status using the "JVMPI" interface (Java Virtual Machine Profiler Interface) operated during "runtime" execution of the JVM program. The problem with this approach is that the JVMPI interface often cannot allocate sufficient memory to build such a "heap dump" representation when the heap size is large, and the JVM then ceases to function due to lack of remaining free memory and any possibility of analyzing the data heap to correct memory leaks that have occurred as a result of operation of the program is then lost.

Such an analysis is further complicated in cases where a memory leak occurs during actual operation of a "production" data processing system, due to the need to maintain an acceptable level of performance while the diagnosis proceeds during execution of the program, since most memory leak analysis tools cause a degradation in performance of the JVM application during operation and are therefore unsuited to correcting (or "debugging") memory leaks in a "live" system. Standard "profiler" programs used to detect memory leaks are normally loaded into memory for execution only once during initialization of the JVM program and then remain in memory until operation of the JVM is terminated. However, due to the iterative nature of problem solving, incremental changes in the understanding of the problem will usually require such a profiler to be re-designed and re-coded in several cycles in order to extract the information needed to detect a memory leak, in turn causing multiple undesired "shutdown" and "restart" cycles during operation of the JVM program.

The invention discloses use of the "profiler" as a separate program tool to analyze "heap dumps" for identifying data elements or objects that may have experienced a memory leak, which allows the profiler to be modified and reloaded into memory for execution as necessary without ceasing operation of the JVM program. As a result, the runtime impact on the executed JVM application program is minimal, allowing memory leak analysis to be performed on a "live" system with a minimal degradation in performance.

SUMMARY OF THE INVENTION

An invention is disclosed for analyzing memory leaks occurring in Java Virtual Machine (JVM) data storage, consisting of a dynamically modifiable JVM "profiler" and an "object tracker" tool for analyzing the output from the profiler. Specifically, a method and system is disclosed for programming a JVM profiler used to analyze and correct memory leaks in stored data heaps, consisting of a program segment (or "stub") initialized by the JVM interface program to determine the parameters to be passed to the main profiler memory leak analysis program logic, which is then initialized by the stub to examine a minimal number of "heap dumps" in order to identify data elements or objects for the existence and/or correction of memory leaks. The analysis of the heap dumps is performed outside of the JVM being diagnosed and therefore does not affect the execution phases of the JVM program. Updated information on data elements or objects can be requested from the profiler as needed (i.e., 'on demand') by use of the object movement tracking option to record the details of subsequent changes in data memory storage status once a heap dump has been obtained.

It is therefore an object of the present invention to analyze memory leaks occurring in Java Virtual Machine (JVM) data storage through use of a dynamically modifiable JVM profiler and an object tracker tool for analyzing the output from the profiler.

It is another object of the present invention to provide a method and system for programming a JVM profiler used to analyze and correct memory leaks in stored data heaps, consisting of a program segment (or stub) initialized by the JVM program interface to determine the parameters to be passed to the main profiler memory leak analysis program, which is initialized by the stub to examine a number of heap dumps in order to identify data elements or objects for the existence and/or correction of memory leaks.

It is another object of the present invention to request updated information on data elements or objects from the profiler as needed by use of the object movement tracking option to record the details of subsequent changes in data memory storage status once a heap dump has been obtained.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

DETAILED DESCRIPTION OF THE PREFERRED EMBODIMENTS

Figure 1:
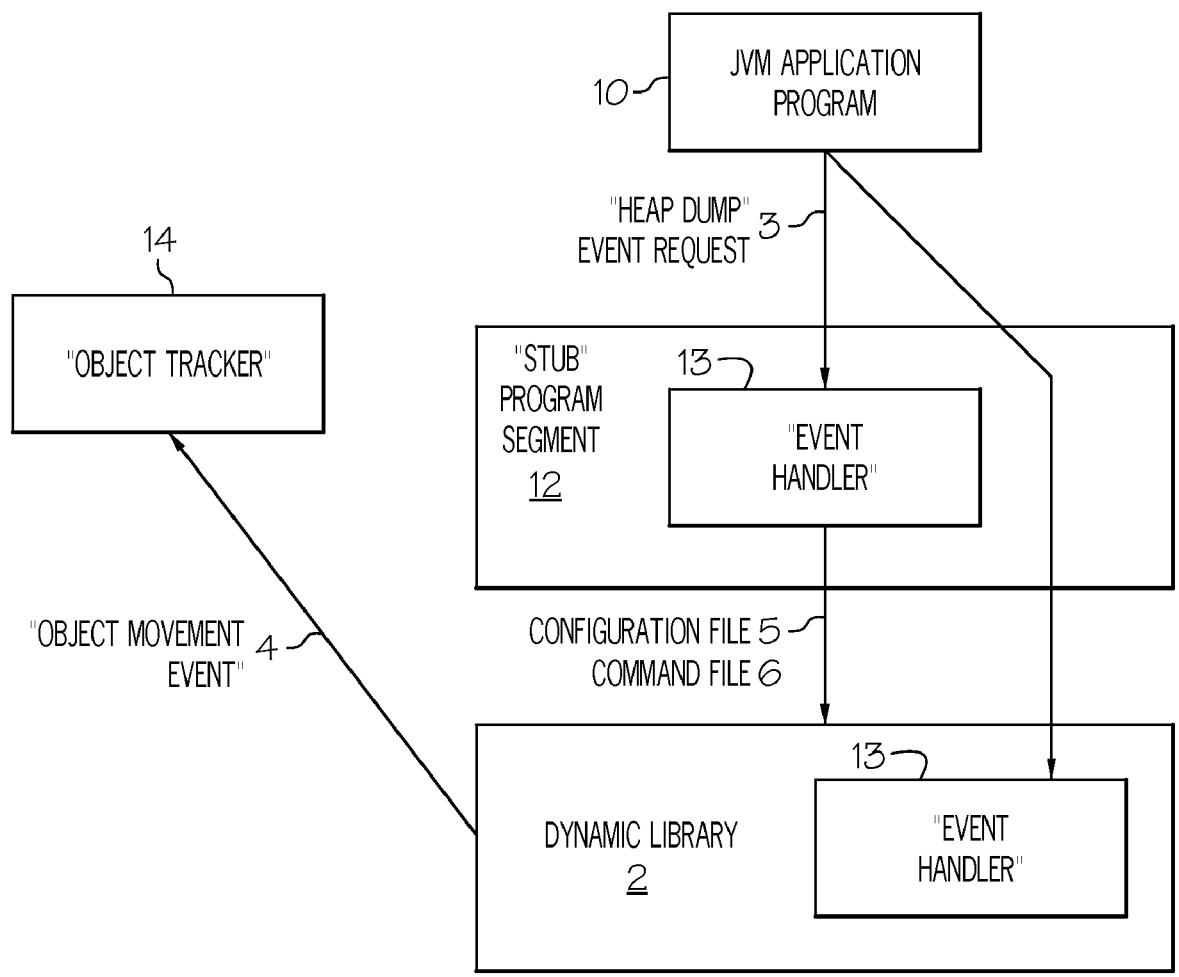
FIG. 1 is a flowchart illustrating the components of the "profiler" of the present invention.
Figure 2:
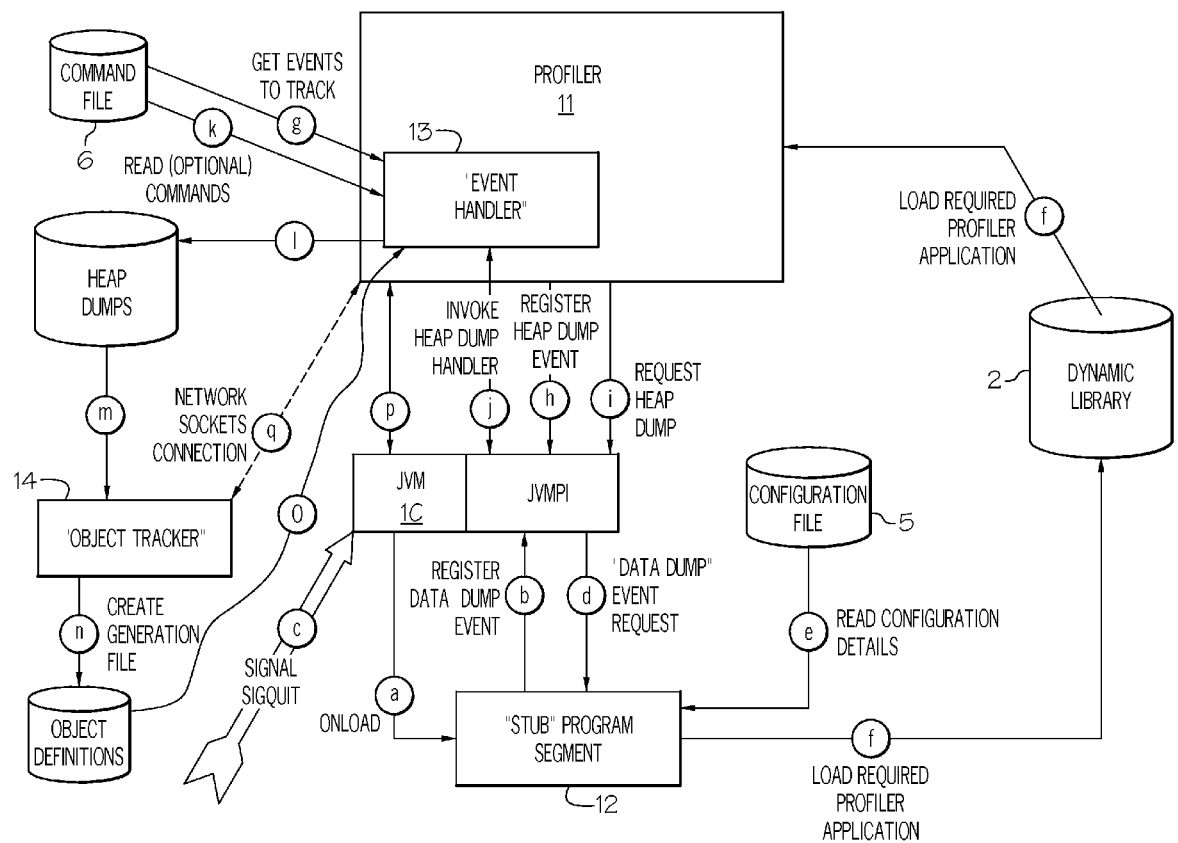
FIG. 2 is a flowchart illustrating operation of the "profiler" of the present invention.

Memory leak analysis is achieved through use of a combination of functions contained in a Java Virtual Machine (JVM) instruction compiler library acting in cooperation with functions packaged in the dynamically modifiable "profiler" program tool. As illustrated in FIG. 1 and in program processing steps "a" through "q" in FIG. 2, a preferred embodiment of the profiler 11 consists of a "stub" program segment 12 loaded by the JVM interface program 10 during initialization (to invoke its "JVM_OnLoad" function) which enables execution of the JVMPI_EVENT_DATA_DUMP_REQUEST (i.e., "heap dump event request") 3 by associating it with an "event handler" 13 that processes the registered event(s) when a SIGQUIT instruction is sent to the JVM program interface 10 to cause passing of the event request to the stub. The event handler 13 of the stub 12 reads the configuration file 5 of the heap dump event request 3 to determine the parameters (including the name and location of the dynamic library 2) to be loaded into memory for execution, with the contents of the configuration file and the dynamic library being capable of modification between processing of successive event requests. Once loaded, control of the dynamic library is passed to the stub 12 which then issues further heap dump event requests 3 as required while first switching the event handler 13 control block to address (or "point to") the dynamic library 2 for obtaining compiled instructions to execute the event request. Upon completed execution of a heap dump event request 3, the event handler 13 is restored to its original state so that the next event request can be processed by the stub 12, while the dynamic library 2 is then removed (or "unloaded") from memory by the stub so that it can be modified (and rebuilt) if required without stopping (and re-starting) operation of the JVM program 10.

The "object tracker" 14 is a multi-tasked/threaded application (preferably programmed in "C" (or a similar programming language that has direct memory management functions) that is used to process the heap dump files created by the heap dump event request(s) 3 (together with the "object movement event" files 4) generated by the stub 12 so that it is possible to track the existence of "surviving" data elements or objects across multiple heap dump files in order to detect memory leakage. (An object that has survived two heap dump events is said to belong to generation "one". Similarly an object surviving three heap dumps is said to belong to generation "two", etc.) The object tracker tool 14 can be instructed to create a list of objects existing in a specified "generation" that can be provided to the profiler 11. The object tracker 14 consists of a configurable memory "cache" of stored object entries for which a "hashing algorithm" can be executed (using the objectID) to find the location in the cache for storing or retrieving an object. (An object is assumed to match another object in the cache if both objects have matching objectIDs and object types.) When a new heap dump file 3 is processed, each object contained in that heap dump is added to the object tracker cache 14 (if it doesn't already exist) and the "generation counter" for each existing entry is incremented. Once the heap dump 3 has been processed, any remaining entries in the object tracker cache 14 (that were not either newly inserted or updated) are removed on the assumption that they are no longer "surviving live" objects to be used by the JVM program 10.

Zero or more object movement events 4 can be processed between processing heap dumps 3. An object movement event file consists of a binary stream of entries each containing the 'Before objectID' and the 'After objectID' of the object(s) that have moved. As each object entry is processed, the object tracker cache 14 is searched for a matching 'Before objectID' indicating its location before movement that is updated with the 'After objectID' of its new location if a match is found. In this manner, "live" objects can be detected when a heap dump is processed (and the generation counter for each can be correctly incremented) if all object movements have been recorded since processing of the previous heap dump, and if all object movement event files 4 have been processed in the same order as their creation.

The idea behind this approach is that the longer an object persists in the object tracker cache 14, the more likely it is to be a "leaking object" that has not been released by the JVM program. To facilitate identification of such leaking objects, the object tracker tool 14 provides a "DUMP_STATS" command identifying the number of program objects belonging to each processing generation. (A generation applies to a group of objects that were added to the object tracker cache during the processing of a heap dump, i.e., if the object continues to exist after execution of the next heap dump then its generation counter is incremented to "1" and if it continues to exist following the next successive heap dump then the generation counter is incremented to "2", etc.) Using the "DUMP_STATS" command in this manner, a specific generation number can be identified and the object tracker 14 can be instructed to write (or "dump") all objects having the required generation number into a single "objectID" file 4. The resulting file can then be provided to the profiler 11 to obtain further details such as the class, size, and/or contents (if a character array) of each object in the file.

Once the dynamic library 2 has been invoked on receipt of a heap dump event request 3, the event handler 13 of the stub 12 uses the configuration file 5 to determine the name and location of an optional profiler command file 6 that provides a mechanism for controlling (and/or changing) execution of the profiler 11 without having to rebuild the library between different instances of program execution. In the absence of a command file, a "type 0 heap dump" is written to an output file, and the output file name is changed by using a fixed "stem" and a numeric sequence for a "suffix" upon each invocation of the "profiler" 11. The functions supported by the command file 6 include:

DUMP_LIVE_OBJECTS:
[MONITOR_MOVED_OBJECTS=<yes/no>]

This command instructs the profiler 11 to preferably request a "type 0 heap dump" via a JVMPI heap dump event request 3. The contents of any memory buffer location(s) used for the heap dump can be written to a text file containing the data object type and identification (objectID) for each data element or object retrieved during the heap dump. For example, the following list contains four (4) data objects with the first column identifying the object type and the second column providing its objectID (in hexadecimal notation):

| | |
|---|---|
| 0 | 44E703A9 |
| 2 | 44E704D9 |
| 5 | 44E70609 |
| 0 | 44E70739 |

LIST_OBJECTS_WITH_CHECK:OBJECT_LIST=<input object file>[,CATCHUP_MOVED_OBJECTS_VALUE=n] [, DEFAULT_PRINT_BYTES=nnn]

This command instructs the profiler 11 to read the specified input file (in the same format as the file output by DUMP_LIVE_OBJECTS 3) and invokes the heap dump event request to obtain further information for each data object specified, including the object class and size and the contents of its character arrays (where its print output length is determined by the DEFAULT_PRINT_BYTES value). The output from this command is written to the next output file in the sequence, while the input list of objects is typically generated as an output from the "object tracker" tool 14.

MONITOR_MOVED_OBJECTS

This command enables object movement event recording, where the stub 12 processes each JVMPI_EVENT_OBJECT_MOVE event 4 by writing the resulting old and new objectIDs to an output stream. This function can also be enabled by specifying the MONITOR_MOVED_OBJECTS option of the DUMP_LIVE_OBJECTS command, which causes object movement recording to be enabled immediately upon a return from JVMPI_EVENT_DATA_DUMP_REQUEST 3 processing, thereby ensuring that data objects contained in the heap dump cannot move without being recorded. The memory usage overhead of this function can be minimized by using a memory buffer that is only occasionally directed (or "flushed") to the output stream, and by writing data in binary format to minimize file sizes. Maximum output file size can be determined using the parameters contained in the configuration file 5 accessed by the stub 12.

RETRIEVE_OBJECTS_USING_JNI:
OBJECT_LIST=<input object file>, OBJECT_DEFINITIONS=<object definition file>[, DEFAULT_PRINT_BYTES=nnn]

This command provides a way to obtain details about "live" objects (other than character arrays). Such objects are specified in an input file consisting of object type, object ID, object size and object class. All non-primitive object classes (i.e. class type "0") must have their object definition details provided in a separate file denoted by the OBJECT_DEFINITIONS parameter. The following example illustrates an object class named "mjbinternal" which has a string variable and an integer variable ('s' and 'mikesint' respectively):

mjbinternal String,s int,mikesint.

During the processing of the RETRIEVE_OBJECTS_USING_JNI request, the profiler 11 uses the information contained in the object definition file to form JNI requests to extract the variable values held by the specified object(s), which allows the dynamic query of object values during system runtime. The format of the entries in the OBJECT_LIST file is the same as the output format generated by the LIST_OBJECTS_WITH_CHECK command. In the following example two instances of the mjbinternal object class have been listed with each being 20 bytes in size. By providing this information to the profiler 11 with the RETRIEVE_OBJECTS_USING_JNI request, detailed information concerning the object can be extracted:

| 0 | 00B9C7F8 | 20 | mjbinternal |
| 0 | 00B9C9F8 | 20 | mjbinternal |

Successful execution of this command provides an output file containing the variable values for the specified objects:
  00B9C7F8
    Field 's' value: Some string value
    Field 'mikesint' value: 44
  00B9C9F8
    Field 's' value: Another string value
    Field 'mikesint' value: 55
      DUMP_WITH_DETAILS This command generates an output heap dump file 3 containing a list of all "live" objects together with the type, size and class name for each one. For character arrays, the first n bytes of the array are also output (where the value of n is configurable). An example output is shown below:

| 56 | java.net.URL |
| 272 | [char 128 "file:/iws/v01/opt/IBM/WebSphereICS/jre/lib/endorsed/xml.jar!/..." |
| 24 | java.lang.String |
| 200 | [char 94 "file:/iws/v0l/opt/IBM/WebSphereICS/jre/lib/endorsed/xml.jar........" |
| 24 | [char |
| 48 | java.util.jar.JarFile |
| 32 | java.lang.ref.Finalizer |
| 24 | java.util.Vector |
| 56 | [java.lang.Object |
| 40 | java.util.zip.Inflater |
| 32 | java.lang.ref.Finalizer |
| 528 | [byte |
| 24 | java.util.HashMap$Entry |
| 272 | [char 130 "file:/iws/v0l/opt/IBM/WebSphereICS/jre/lib/endorsed/xml.jar!/ME" |
| 40 | java.util.HashMap |
| 80 | [java.util.HashMap$Entry |

The object tracker tool 14 can be optimized to automatically process a sequence of input files, for example:
  heap.dump.2
  heap.dump.4
  objMov.3-2
  objMov.2-1
  objMov.3-1
  heap.dump.1
  objMov.2-2
  objMov.3-3
  heap.dump.3
  objMov.1-1
  objMov.2-2
  objMov.4-1

The object tracker 14 supports a range of commands designed to simplify the analysis process, including CACHE_AND_MOVE_MULTIPLE_OBJECTS whereby each file will be processed in the following order when executing the example command CACHE_AND_MOVE_MULTIPLE_OBJECTS, heap.dump,objectMov,1:
  heap.dump.1
    objMov.1-1
  heap.dump.2
    objMov.2-1
    objMov.2-2
  heap.dump.3
    objMov.3-1
    objMov.3-2
    objMov.3-3
  heap.dump.4
    objMov.4-1

Under this instruction, the object tracker 14 will terminate the processing of object movement event files 4 when it determines that "objMov.4-2" does not exist, and it will stop processing heap dump event request(s) 3 when it determines that "heap.dump.5" does not exist.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A computer system, comprising:
a memory;
a modifiable profiler coupled to the memory, the modifiable profiler being programmed to:
in response to a first heap dump event request comprising a first configuration file, create a plurality of heap dump files by causing successive dumping of a heap of the memory, the plurality of heap dump files comprising a first and a second heap dump file, each of the plurality of heap dump files comprising a plurality of objects;
determine a first command file from the first configuration file, the first command file controlling the modifiable profiler; and
in response to a second heap dump event request comprising a second configuration file, determine a second command file, the second command file modifying control of the modifiable profiler; and
an object tracker coupled to the memory, the object tracker being programmed to:
store in a cache an object identification for each of the objects in the first heap dump file;
associate one of a plurality of generation numbers with each of the object identifications stored in the cache;
identify a specific one of the plurality of generation numbers; and
remove persistent objects from the heap to correct a memory leak and dump the persistent objects into a file, each of the persistent objects having a corresponding object identification stored in the cache with an associated the specific one of the plurality of generation numbers.

2. The computer system of claim 1, where each of the plurality of generation numbers corresponds to a number of consecutive heap dump files that comprise a same object.

3. The computer system of claim 1, where the object tracker is further programmed to:
create an object movement event file comprising a first memory location of a first object before movement of the first object, and a second memory location of the first object after movement of the first object, the object movement event file being created between creation of two consecutive ones of the plurality of heap dump files.

4. The computer system of claim 1, where the object tracker is further programmed to remove from the cache a first object identification corresponding to a first object in the first heap dump file, if the first object is not in the second heap dump file successive to the first heap dump file.

5. The computer system of claim 1, where the command file is comprised of one or more of the following:
a command for initiating examination of the heap using an event request;
a command for recording an object movement event;
a command for extracting any variable values held by a specified object; or
a command for obtaining identifying information selected from a group consisting of the type, class, size, memory location and contents of any character arrays for the specified object.

6. A method, comprising:
in response to a first heap dump event request comprising a first configuration file, executing a profiler program to create a plurality of heap dump files by causing successive dumping of a heap of a computer memory, the plurality of heap dump files comprising a first and a second heap dump file, each of the plurality of heap dump files comprising a plurality of objects;
determining a first command file from the first configuration file, the first command file controlling execution of the profiler program;
in response to a second heap dump event request comprising a second configuration file, determining a second command file, the second command file modifying the execution of the profiler program;
storing in a computer cache an object identification for each of the objects in the first heap dump file;
associating one of a plurality of generation numbers with each of the object identifications stored in the computer cache;
identifying a specific one of the plurality of generation numbers; and
removing persistent objects from the heap to correct a memory leak and dumping the persistent objects into a file, each of the persistent objects having a corresponding object identification stored in the computer cache with an associated the specific one of the plurality of generation numbers.

7. The method of claim 6 where each of the plurality of generation numbers corresponds to a number of consecutive heap dump files that comprise a same object.

8. The method of claim 6, further comprising:
creating an object movement event file comprising a first memory location of a first object before movement of the first object, and a second memory location of the first object after movement of the first object, the object movement event file being created between creation of two consecutive ones of the plurality of heap dump files.

9. The method of claim 6, further comprising removing from the computer cache a first object identification corresponding to a first object in the first heap dump file if the first object is not in the second heap dump file successive to the first heap dump file.

10. The method of claim 6, where the command file is comprised of one or more of the following:
a command for initiating examination of the heap using an event request;
a command for recording an object movement event;
a command for extracting any variable values held by a specified data element or object; or
a command for obtaining identifying information selected from a group consisting of the type, class, size, memory location and contents of any character arrays for the specified or object.

11. A computer program product comprising a computer readable storage medium containing program instructions, where the program instructions when executed on a computer cause the computer to:
in response to a first heap dump event request comprising a first configuration file, execute a profiler program to create a plurality of heap dump files by causing successive dumping of a heap of a computer memory, the plurality of heap dump files comprising a first and a second heap dump file, each of the plurality of heap dump files comprising a plurality of objects;
determine a first command file from the first configuration file, the first command file controlling execution of the profiler program;
in response to a second heap dump event request comprising a second configuration file, determine a second command file, the second command file modifying the execution of the profiler program;

store in a cache an object identification for each of the objects in the first heap dump file;

associate one of a plurality of generation numbers with each of the object identifications stored in the cache;

identify a specific one of the plurality of generation numbers; and remove persistent objects from the heap to correct a memory leak and dump the persistent objects into a file, each of the persistent objects having a corresponding object identification stored in the cache with an associated the specific one of the plurality generation numbers.

12. The computer program product of claim 11, where each of the plurality of generation numbers corresponds to a number of consecutive heap dump files that comprise a same object.

13. The computer program product of claim 11, where the program instructions when executed on the computer further cause the computer to:

create an object movement event file comprising a first memory location of a first object before movement of the first object, and a second memory location of the first object after movement of the first object, the object movement event file being created between creation of two consecutive ones of the plurality of heap dump files.

14. The computer program product of claim 11, where the program instructions when executed on the computer further cause the computer to remove from the cache a first object identification corresponding to a first object in the first heap dump file if the first object is not in the second heap dump file successive to the first heap dump file.

15. The computer program product of claim 11, where the command file is comprised of one or more of the following:

a command for initiating examination of the heap using an event request;

command for recording an object movement event;

a command for extracting any variable values held by a specified object; or a command for obtaining identifying information selected from a group consisting of the type, class, size, memory location and contents of any character arrays for the specified object.

* * * * *